United States Patent [19]

Fischbach

[11] Patent Number: 5,356,576
[45] Date of Patent: Oct. 18, 1994

[54] PROCESS FOR THE MANUFACTURE OF PLASTIC MOLDINGS WITH DECORATIVE COATING

[75] Inventor: Gunther Fischbach, Lauf Pegnitz, Fed. Rep. of Germany

[73] Assignee: Mannesmann Aktiengesellschaft, Düsseldorf, Fed. Rep. of Germany

[21] Appl. No.: 854,714

[22] Filed: Mar. 23, 1992

[30] Foreign Application Priority Data

Mar. 26, 1991 [DE] Fed. Rep. of Germany ....... 4110445

[51] Int. Cl.5 .................. B29C 45/18; B29C 45/76
[52] U.S. Cl. ................................. 264/40.4; 264/257; 264/259; 264/328.8; 264/40.1; 425/120; 425/129.1
[58] Field of Search .............. 264/40.4, 328.8, 266, 264/316, 40.1, 257, 259; 425/120, 129.1

[56] References Cited

U.S. PATENT DOCUMENTS

| | | | |
|---|---|---|---|
| 4,389,358 | 6/1983 | Hendry | 264/40.4 |
| 4,390,332 | 6/1983 | Hendry | 264/40.4 |
| 5,049,325 | 9/1991 | Aoki et al. | 264/40.4 |

FOREIGN PATENT DOCUMENTS

| | | |
|---|---|---|
| 397883 | 11/1990 | European Pat. Off. . |
| 2548318 | 5/1977 | Fed. Rep. of Germany . |
| 3738212 | 5/1989 | Fed. Rep. of Germany . |
| 3916674 | 12/1989 | Fed. Rep. of Germany . |

*Primary Examiner*—Jan H. Silbaugh
*Assistant Examiner*—A. Ortiz
*Attorney, Agent, or Firm*—Nils H. Ljungman

[57] ABSTRACT

A process for the manufacture of plastic moldings with decorative coatings by injection molding, on an injection molding machine with an injection screw, which introduces the plastic into a cavity located in a mold clamping device, and an apparatus for the performance of the process.

20 Claims, 9 Drawing Sheets

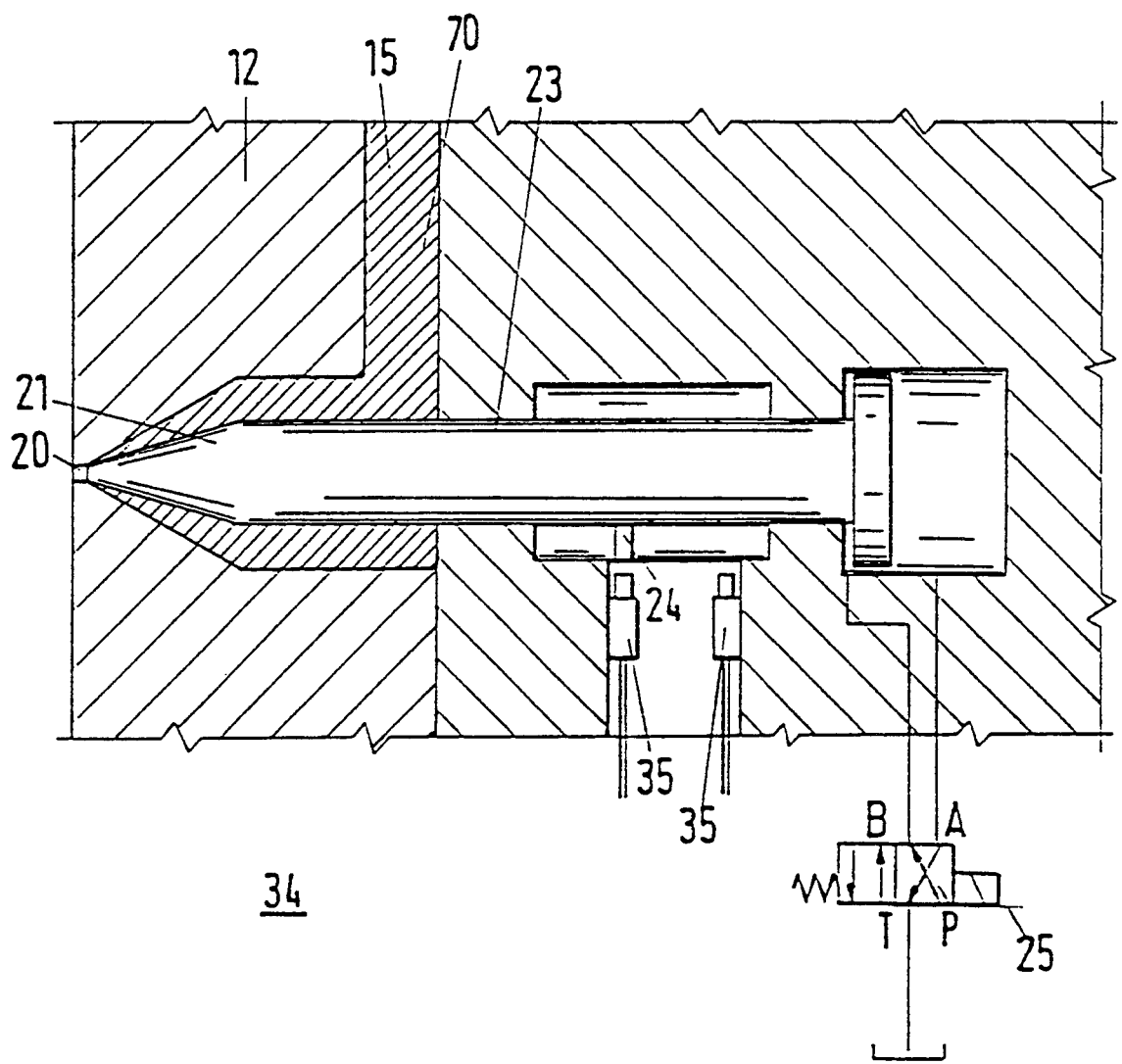

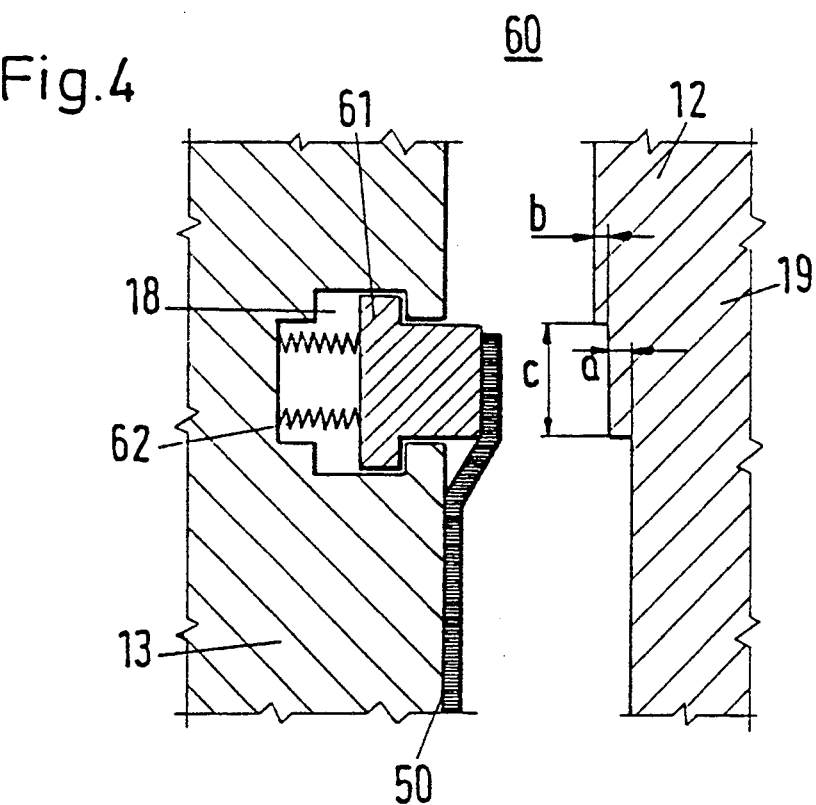
Fig.4
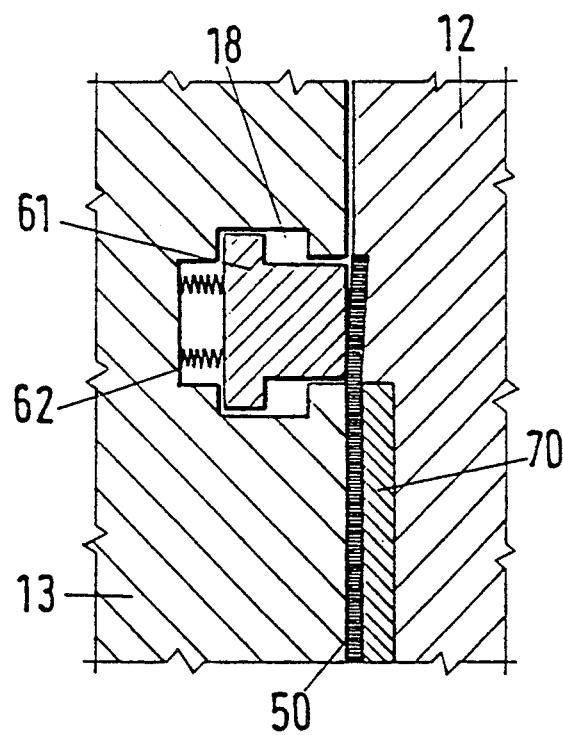

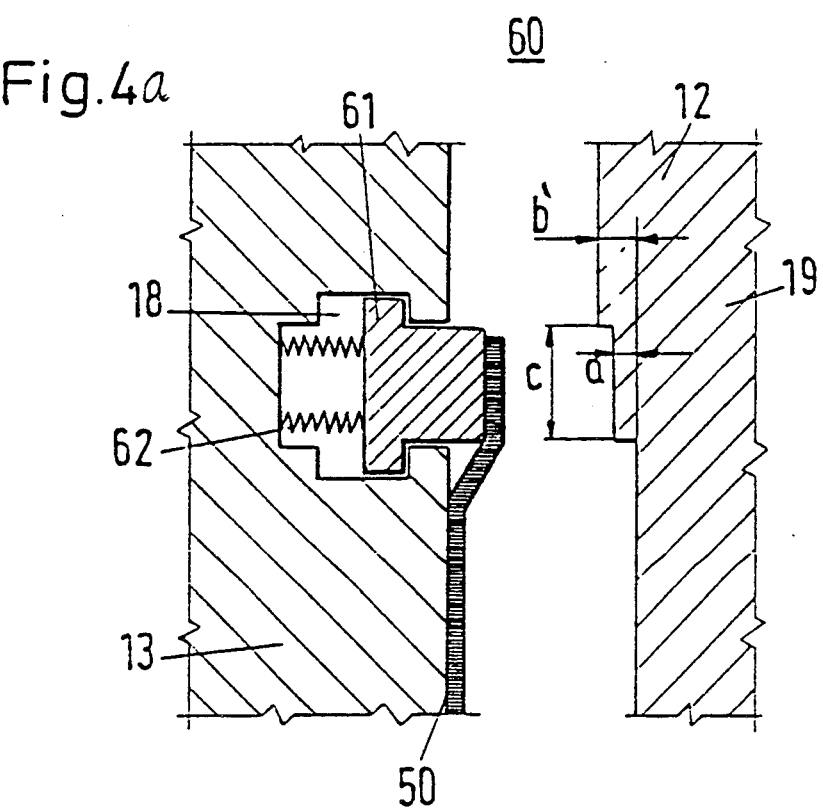
Fig.4a
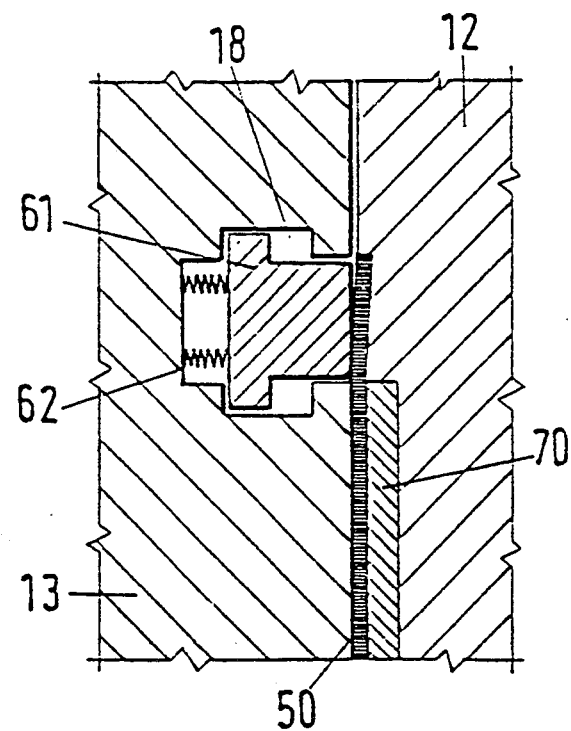

PROCESS FOR THE MANUFACTURE OF PLASTIC MOLDINGS WITH DECORATIVE COATING

BACKGROUND OF THE INVENTION

1. Field of the Invention

This invention relates to a process for the manufacture of plastic moldings with a decorative coating, by injection molding in an injection molding machine, which injection molding machine has an injection screw which introduces the plastic into the cavity located in a mold clamping device. This invention also relates to an injection molding machine with an injection screw, which is connected by closable hot runners to the cavity of a clamping device consisting of a stationary mold part and a movable mold part, including the drive mechanisms, and with measurement and control components for the control of the process.

2. Background Information

The application of a decorative coating in the form of textiles, leather, films etc. to the surface of plastic parts is generally done by lamination. As an alternative to this relatively labor-intensive process, the bond between the materials can also be achieved in a single operation by rear injection. That is, the plastic can be injected directly onto the decorative coating, which decorative coating is placed within the mold.

The article from "Kunststoffe 80" (1990) 9, Page 997 ff. "Hinterspritzen von Dekormaterialien durch Niederdruckspritzgieaen" [Rear injection of decorative materials by low pressure injection molding] discloses a method of directly bonding the plastic and decorative materials to one another by injection molding, whereby the decorative materials, several millimeters thick, are rear injected with a thermoplastic material. That is, the decorative material is placed in the mold, so that the decorative material is bonded directly to the plastic during the injection process. This publication also describes pre-testing methods for the rear injection. This publication does not indicate any measures to minimize the pressure to prevent sink marks on ribs and changes in the wall thickness. That is, the decorative coating can be damaged and deformed during the injection process if pressures are too high.

At the Technical Conference on Decorative Moldings held at the South German Plastics Center on Nov. 15 and 16, 1990, reference was made to the use of injection compression devices or swelling molds. This publication also describes the use of a controlled hot runner with long flow distances, and thus the use of cascade technology. A precision regulation system for the data relevant to the injection with graphic display capabilities is also mentioned, and reference is made to the injection pressure. This publication contains no indication that the measurement factor to be used for the cascade control might be the distance travelled by the injection molding screw of the injection molding machine.

German Published Patent Application No. 39 27 995 relates to a process for the control of the holding pressure during the injection molding of thermoplastic plastics. The application discloses nozzle runners which can be closed by shutters, which nozzle runners inject molding compound into the cavity of the mold, and pressure signals which can be used to record the distance measurement signal from the injection screw (Column 4, Lines 9-17). This process, in which one or more desired molding parameters are set as a function of several process parameters recorded during at least one learning cycle to establish the mold-plastic pair, is complex and expensive.

OBJECT OF THE INVENTION

The object of the invention is therefore to create a process and an apparatus for the manufacture of coated plastic moldings, in which and/or using which plastic moldings coated with textile, leather or film can easily be changed by changing the process data with minimum effort and expense.

SUMMARY OF THE INVENTION

This object is achieved by a process for the manufacture of plastic moldings with decorative coating, by injection molding in an injection molding machine with an injection screw which introduces the plastic into the cavity located in a mold clamping device, characterized by the following steps: First, the decorative material is inserted into the cavity and held so that the upper side or decorative side of the decorative coating faces the movable part of the mold. Next, the movable part of the mold of the mold clamping device is then moved in the closing direction. Next, but not later than after the closing of the mold clamping device, the molding compound is injected by a nozzle into the cavity, with the simultaneous measurement of the screw displacement. Next and during the injection of the molding compound by a nozzle, at least one additional nozzle is opened to inject the molding compound, as a function of the screw displacement. Last, after filling the cavity, after a specified length of time, the molding connected to the decorative material is ejected.

The object of the invention is also achieved by an injection molding machine with an injection screw, which is connected by closable hot runners to the cavity of a clamping device consisting of a stationary mold part and a movable mold part, including the drive mechanisms, and with measurement and control components for the control of the process. The injection molding machine is characterized by the fact that on the injection screw there is a displacement transducer, which is connected to an evaluation unit. The evaluation unit is connected to control elements of hot runner shutters. In addition, there is a transport apparatus to feed decorative coating material into the cavity, and there are holding elements on the movable mold part to fix the decorative material.

According to the invention, the coated decorative material consisting of textile, leather or film is securely positioned in the cavity of the mold, which can be filled with molding compound by several hot runner nozzles which can be shut off. The shutters or valves of the hot runner nozzles are activated as a function of the position of the screw during the injection process. The control of the hot runner nozzles is thereby integrated into the control of the injection molding machine.

In the prior art, the activation of the shutter nozzles is controlled as a function of time. In contrast, the present invention controls the shutter nozzles as a function of distance of injection screw displacement. Injection screw displacement is a very accurate gauge of volume of molding material injected. Thus, in the present invention the filling process is not changed as a function of the change of the velocity profile of the screw. The switch system of the hot runner nozzles is coupled to fixed volumetric fill levels of the mold. The organization of the production processes and the sampling of the mold become more favorable, the operation is simplified and sources of malfunctions and errors are eliminated. In particular, the need for the iterative coordination of all the timers is eliminated.

To achieve minimum internal mold pressures, the mold is not completely closed during the injection process, and the injection compression molding process is used. That is, when the mold is not closed completely some of the molding material is able to squeeze out between the mold parts, which allows for the control of pressures. In addition, an injection compression process can be used which involves closing the mold completely or essentially completely, during injection or just after injection of the molding material. This closing of the mold towards the end of the injection phase is called the compression movement or compression motion. For moldings which are to be coated with textile or film decorations, the injection compression molding process is modified to take into consideration the expansion characteristics of the inserted decorative materials. That is, the volume of injected molding material is varied depending on the decorative coating, and the timing of the compression movement is also varied depending on the decorative coating. An additional adjustment, to take the material properties of the decorative material and of the mold into consideration, is achieved by a preliminary pre-compression. The pre-compression process makes it possible to adjust the inserted decorative material to the contour of the mold at any desired rate. That is, the decorative material is pushed into the mold, so that it conforms to the contour of the mold prior to injection of molding material. Thus, the compression rate can be set completely with the objective of minimal internal pressures. That is, since the decorative material has been conformed to the mold, the pressure of the injection process can be minimized because the molding material does not have to force the decorative material into contact with the mold surface. This pre-compression can be accomplished by a form having a similar shape to the molding product. The pre-compression can be accomplished using air pressure.

As a result of the control of the hot runner shutters as a function of distance of the screw, an extremely precise and reproducible adjustment of the shutter elements can be achieved. The internal mold pressure thereby becomes low, and is kept at a uniform level. That makes possible the processing even of sensitive decorative materials, and the achievement of excellent quality characteristics.

The injection compression molding process is further improved by simultaneous compression. Before the end of the injection motion, the velocity of the screw is reduced and the compression motion is activated. That is, the compression motion of the clamping unit substantially closes the mold completely. The pressure increase and the advance of the melting front in the mold is now generated proportionally by the screw and by the clamping unit. That is, the pressure increase results from both the compression motion of the mold and the injection of the molding material. As a result of the continuous flow of the melting front, markings on the moldings are prevented. The conventional drop in pressure and the stopping of the flow front in the mold do not occur. The filling time as the sum of the injection time and the compression time is minimized, with simultaneous low pressure in the mold.

The invention also proposes that during the process, some or all of the hot runner nozzles are opened to initiate the holding pressure. This prevents a situation in which only the nozzles open at the end of the filling plan are activated for the introduction of holding pressure. That is, a holding pressure to maintain the pressure within the mold at the completion of injection and/or compression is maintained by all of the hot runner nozzles.

The injection molding machine according to the invention makes possible the manufacture of precision plastic moldings having a decorative coating with a high degree of mechanization. The insertion of the decorative part and the ejection of the finished moldings is thereby automated. To prevent ejection markings on the decorative surface, with the rear injection technology used here, the ejection apparatus and the gate to the cavity are located on the same side, namely on the stationary part of the mold.

The decorative material, cut to the desired shape and size, is introduced by a conveyor device equipped with needle grippers, and which delivers the material to the gripper device or holding device integrated into the mold. The grabbing motion of the gripper device or holding device, which is composed of two independent movements, consists on one hand of a rotation of the gripper arm by 180 degrees, or travel by the gripper arm already pointing toward it, perpendicular to the direction of the mold movement. That is, the first movement of the gripper device can either be a 180 degree rotation of the gripper arm into position or movement of the gripper arm straight in from the side into position, depending on the embodiment. The decorative material is fixed as a result of the further axial movement of the gripper arm toward the gripping mold half. A spring-loaded pin also projects out of the mold half, against the decorative material. That is, the decorative material is held between a gripper arm and a spring loaded pin, the spring loaded pin being adjacent the mold part and the gripper arm being moved into position over the spring loaded pin.

In an additional configuration of the invention, there is a pneumatic holding device instead of the mechanical device for holding the decorative material on the movable mold half.

During the rear injection of decorative material, in particular textiles, when a cascade control is used for the shutter elements of the hot runner nozzles, generally one single hot runner nozzle is opened for the duration of the filling process. That is, shutter elements of the hot runner nozzles are opened and closed in series and in a specified pattern depending on the specific molding being produced, and one of the hot runner nozzles is generally open during the entire filling process. In one embodiment of the invention the shutters of the hot runners are controlled by needle valves. To make certain that if malfunctions occur in the hot runner, there is an immediate reaction by the control system, e.g. the stopping of the injection process, with the simultaneous dispatch of a malfunction message to the operator terminal and rejection of the molding, it is necessary to monitor the position of the hot runner needle. That is, since a cascade system is used to open the hot runner nozzles, it is important to know which nozzles are open, so that the open nozzles can be closed in the event of a malfunction. This is accomplished by limit switches for the forward and rear limit position of the hot runner needle of the shutter.

On the injection molding machine according to the invention, there are elements which make possible a special configuration of the decorative coatings. When using the rear injection technique, it is often necessary to allow the decorative material to project beyond the end of the plastic backing. That is, the decorative material extends beyond the edge of the plastic molding, which plastic molding is injected onto the decorative material. The purpose of this measure is to make a fold with the projecting decorative material, to achieve a smooth optical transition between the decorative material at the edge of the molding. As a result of the use of a design with no mold edges, it is possible to allow a decorative strip to project beyond the mold cavity, whereby the missing mold edges eliminate a rear injection by pressing the decorative material against the second half of the mold in this mold area. That is, the decorative material extends beyond the mold cavity and is pinched between the mold parts to prevent the molding compound from being applied to the edge of the decorative material when the molding compound is injected. This process can also be used for a submerged edge mold. That is, the edge of the decorative material is submerged within the injected plastic.

The proposed injection molding machine includes equipment for the graphic display of the measurement data determined. The monitoring of the compression distance, internal mold pressure and distance of screw travel by a graphic display makes it possible to optically control and individually coordinate the compression and screw advance velocity, with the objective of maintaining minimum internal mold pressures.

One aspect of the invention resides broadly in a process for the manufacture of moldings with a decorative material coating, the decorative material coating having a lower side and a decorated upper side, the plastic molding with a decorative material coating being manufactured by injection molding in an injection molding machine, the injection molding machine having injection device which injection device advances and introduces a molding compound into a mold cavity located in a mold clamping device, the mold clamping device having a movable mold part, the mold cavity having a mold surface, the process comprising the following steps: First inserting the decorative material coating into the mold cavity and holding the decorative material coating so that the decorated upper side of the decorative coating faces the mold surface of the mold cavity; moving the movable mold part of the mold clamping device in a closing direction; at least substantially closing the mold clamping device; injecting a molding compound through a first nozzle into the mold cavity, not later than after at least substantially closing the mold clamping device; simultaneously measuring the injection device displacement while injecting the molding compound, and thereby measuring the amount of molding compound injected into the mold cavity; opening at least a second nozzle through which molding compound is also injected, opening said second nozzle during the injection of the molding compound through the first nozzle, opening said second nozzle based on the injection means displacement; at least substantially filling the mold cavity with molding compound; waiting a specified length of time to allow setting of the molding compound; and ejecting the molding connected to the decorative material.

Another aspect of the invention resides broadly in an injection molding machine comprising: an injection device for injecting molding compound; said injection device having a device for driving the molding compound; a mold clamping device comprising a first mold part and a movable second mold part, said first mold part and said movable second mold part comprising a mold cavity, said mold cavity having an inside surface; a plurality of channels connecting said injection device to said mold cavity; a plurality of valve means disposed along said plurality of channels, said valve means for opening and closing said channels; a device for measuring displacement of said driving device to thereby measure the volume of molding compound injected by said injection device; an evaluation and control unit connected to said means for measuring displacement of said driving means and connected to said plurality of valve means, said evaluation and control unit for controlling said plurality of valve means based on said means for measuring displacement of said driving means; a transport apparatus to feed decorative material into said mold cavity; and holding means on said mold clamping device to hold the decorative material.

BRIEF DESCRIPTION OF THE DRAWINGS

One example of the invention is described in greater detail below and illustrated in the accompanying figures.

FIG. 2a shows the shutter of a hot runner nozzle,

FIG. 4 shows an edge molding apparatus, and

FIG. 4a shows an edge molding apparatus.

DESCRIPTION OF THE PREFERRED EMBODIMENT

Figure 1:
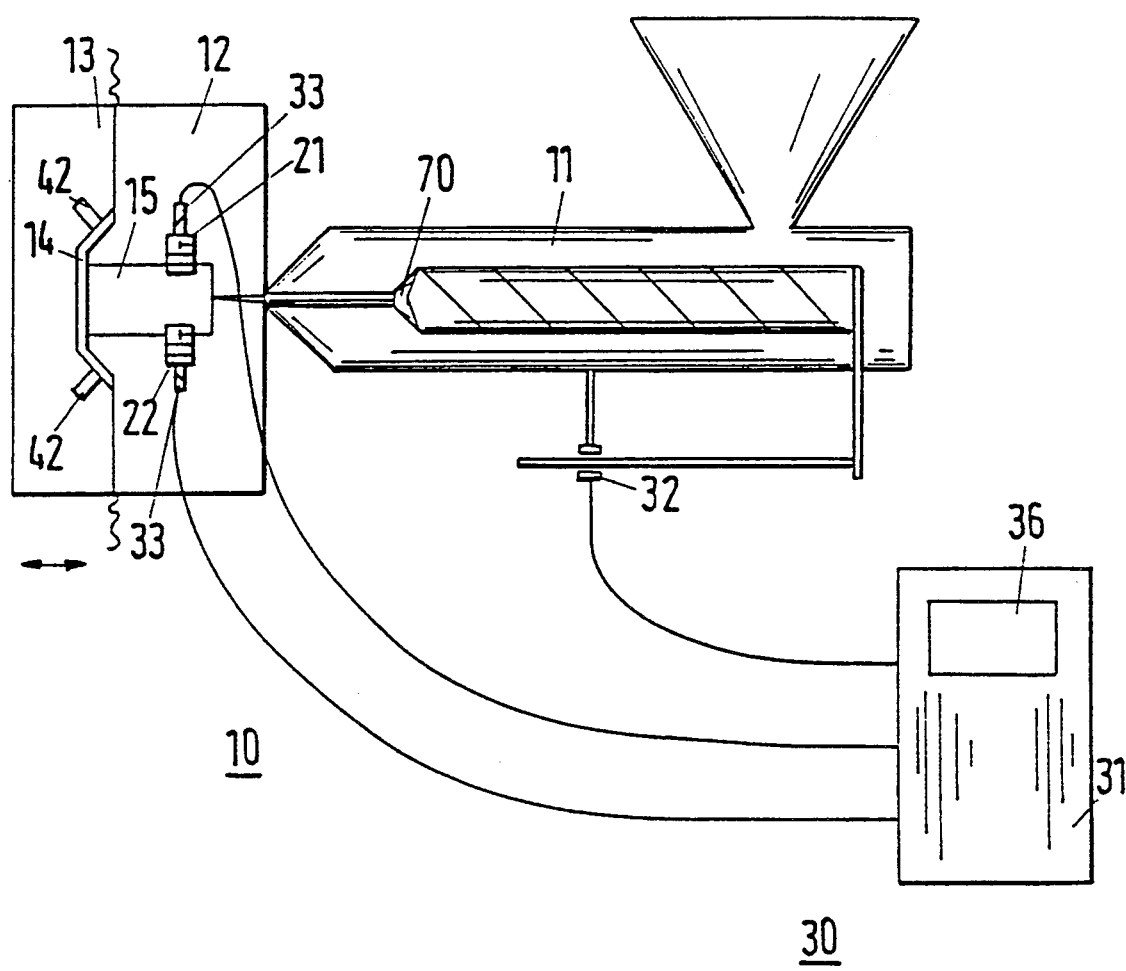
FIG. 1 shows an overview of the injection molding machine.
Figure 1A:
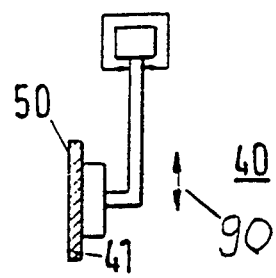
FIG. 1a shows an overview of the injection molding machine.
Figure 1A:
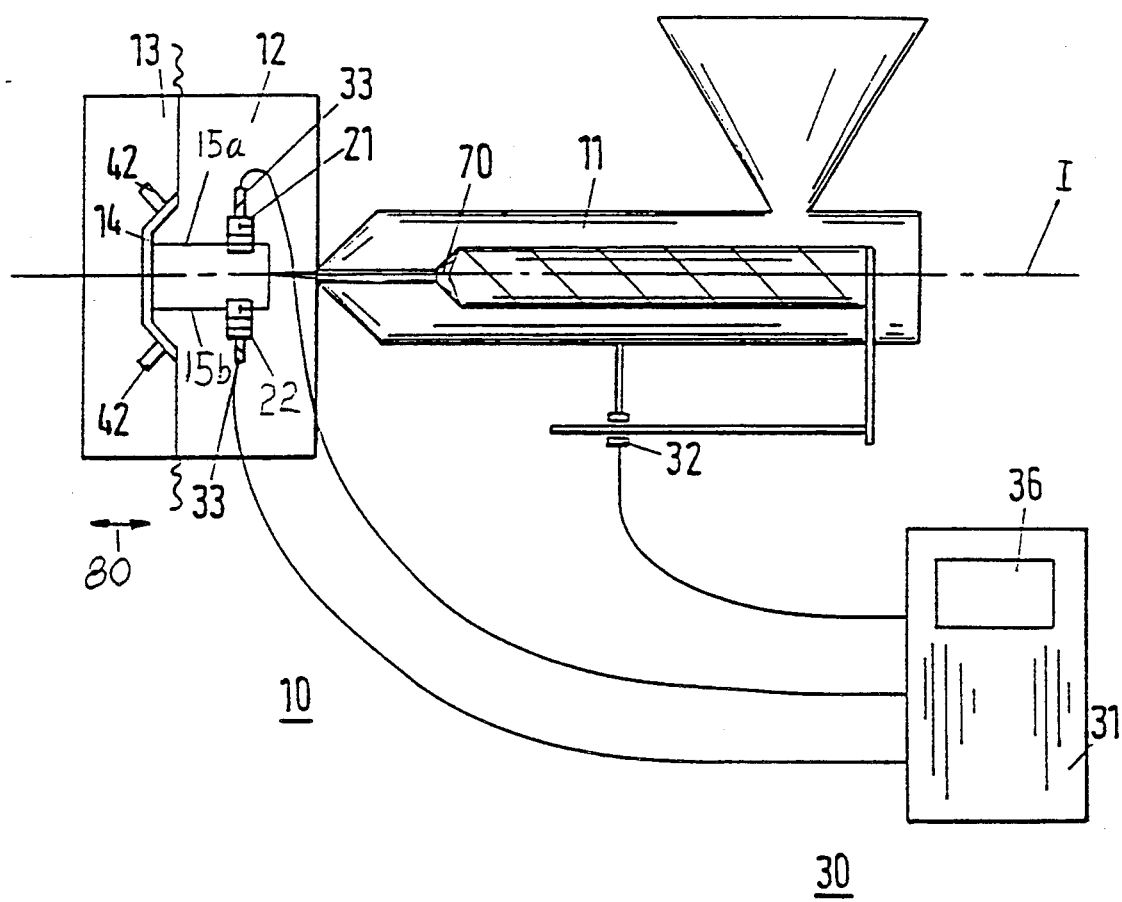

FIG. 1 shows an injection molding machine 10 with an injection molding screw 11, which can inject molding compound 70 by way of hot runners or hot channels 15 and 16 into a cavity 14. That is, injection screw 11 drives molding compound 70. FIG. 1a shows hot runners or hot channels 15a and 15b. FIG. 1a also shows injection molding machine 10 having central axis I. The cavity 14 is located in a mold clamping device, which consists of a stationary mold part 12 and a movable mold part 13. Movable molding part 13 moves essentially parallel to axis I. The hot runners 15, 16, 15a, 15b leading to the mold cavity 14 can be closed by hot runner shutters or valves 21, 22, which can be controlled by way of control elements 33.

In the vicinity of the mold clamping device, there is a transport device 40, which has a needle gripper 41 holding the decorative material 50, which inserts the decorative material 50 into the opened cavity, in which the decorative material 50 can be fixed by holding elements 42. The transport device 40 picks up the decorative material 50 from a stock of decorative material. The transport device 40 then moves the decorative material 50 into the open cavity 15. Movable mold part 13 moves back and forth in direction 80 to open and close the mold cavity 14. The transport device 40 moves back and forth in the direction 90 to pick up and move the decorative material 50 into the open cavity 14. The movement of the transport device 40 and the movement of movable mold part 13 are coordinated to bring the decorative material into the open cavity 14 and allow the transfer of the decorative material to holding elements 42. For example, movable mold part 13 opens by moving to the left along direction 80. Transport device 40, after picking up decorative material 50 by way of needle gripper 41, moves towards movable mold part 13 by moving down along direction 90. Once the decorative material 50 is in front of the open cavity 14, the movable mold part 13 can be moved to the right along direction 80 to engage the decorative material 50. Alternatively, after the decorative material is in front of the open cavity 14, transport device 40 can be designed to move the decorative material to the left, thus engaging the decorative material with the movable mold part 13. Then holding elements 42 are activated, so that decorative material 50 is secured to movable mold part 13. The transport device 40 can be a robotic arm or some other apparatus well known in the prior art.

The injection molding machine is equipped with measurement and control components 30. On the injection molding machine 10 there is a displacement transducer 32, which is connected for measurement and control purposes to an evaluation device 31. That is, control components 30, of which evaluation device 31 is a part, measure and control the injection molding machine 10 and the process. The evaluation device 31 is connected, among other things, to the control elements 33 of the hot runner shutters 21, 22. The evaluation unit has graphic display elements 36 for the graphic display of measurement data received.

Figure 2:
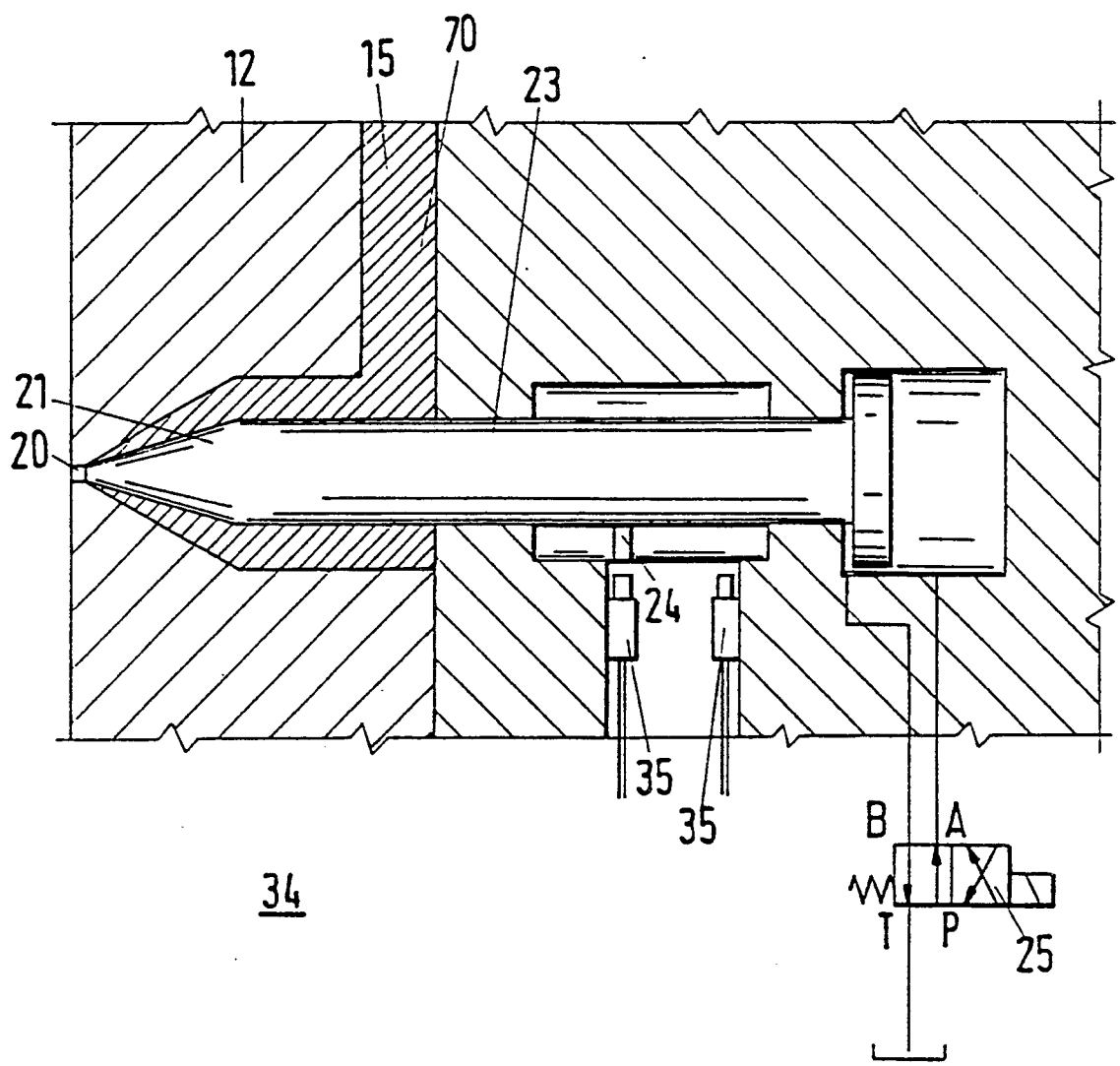
FIG. 2 shows the shutter of a hot runner nozzle.

FIG. 2 shows an injection nozzle 20 with a hot runner shutter 21, which is designed as a needle 23. The needle 23 located in the stationary mold part 12 controls the material flow of the molding compound 70 in the hot runner 15.

The needle 23 has position monitoring elements 34, whereby in the present case there are pins 24 which interact with limit switches 35. The pins 24 act to trigger the limit switches 35. The needle 23 is moved by way of a hydraulic control component 25. The hydraulic component 25 is a two-way valve which has a pressurized hydraulic fluid source entering the valve at port P. With the valve in the position shown in FIG. 2, the pressurized hydraulic fluid passes out of port A towards the piston-cylinder arrangement and the hydraulic fluid returns from the piston-cylinder arrangement through port B of the valve. The hydraulic fluid then exits the valve through port T to a reservoir tank. Thus, the needle 23 is kept in the closed position as shown in FIG. 2a. Alternatively the two-way valve can be switched to the other position as shown in FIG. 2a. In the alternative position of the two-way hydraulic valve, as shown in FIG. 2a, hydraulic fluid is directed from port P, through the valve, and out of port B towards the piston-cylinder arrangement and the hydraulic fluid returns from the piston-cylinder arrangement through port A. The hydraulic fluid then exits the valve through port T to a reservoir tank. Thus, the needle 23 would move to the open position (not shown).

Figure 3:
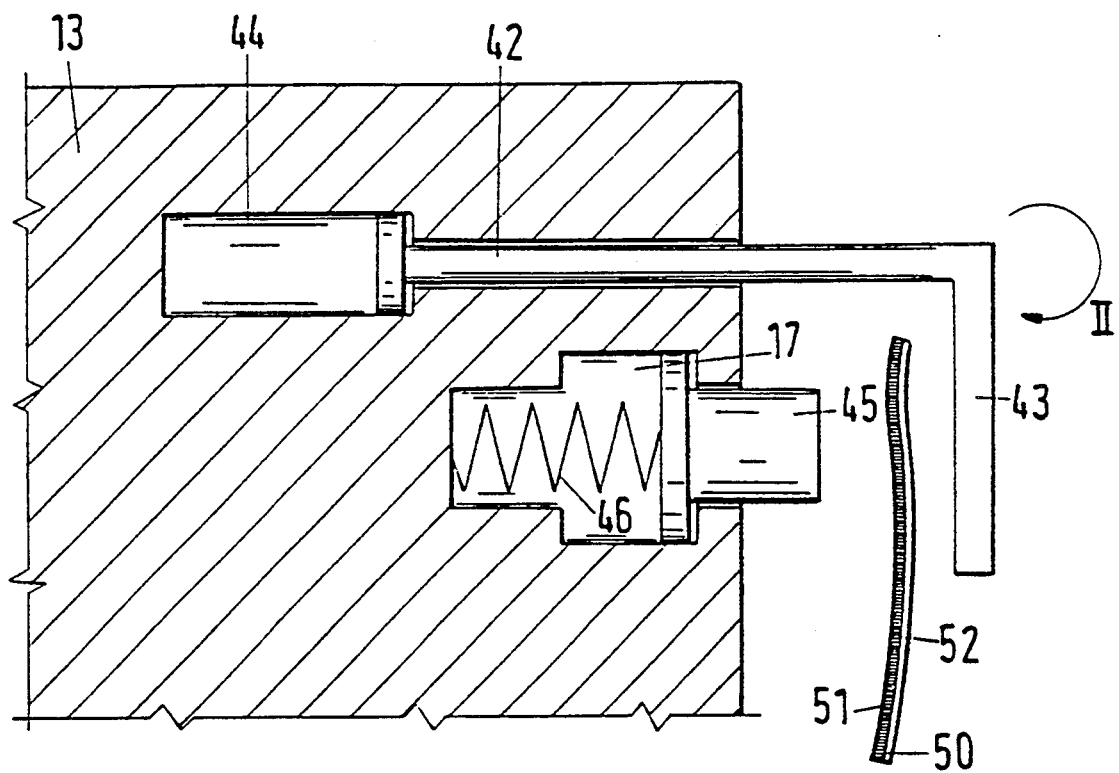
FIG. 3 shows a holding apparatus for the decorative material.

FIG. 3 shows a detail of the movable mold part 13, in which there is a holding element or longitudinal element 42 and a pressing pin 45. The pressing pin 45 is guided in recesses 17, and can be pushed by springs 46 out of the mouth of the recess 17. The end surface of the pressing pin 45 is thereby in contact against the top surface or outer surface 51 of the decorative material 50. The top surface or outer surface 51 has the decorative features which are to be visible on the finished product.

The bottom surface or inner surface 52 is gripped by a gripper hand 43 of the holding element 42, and is guided to a piston-cylinder unit 44 toward movable mold part 13. The bottom or inner surface 52 is to be bonded to the molding compound. The piston-cylinder unit 44 moves holding element 42 in and out, thus bringing gripper hand 43 closer and further away from movable mold part 13.

Figure 3A:
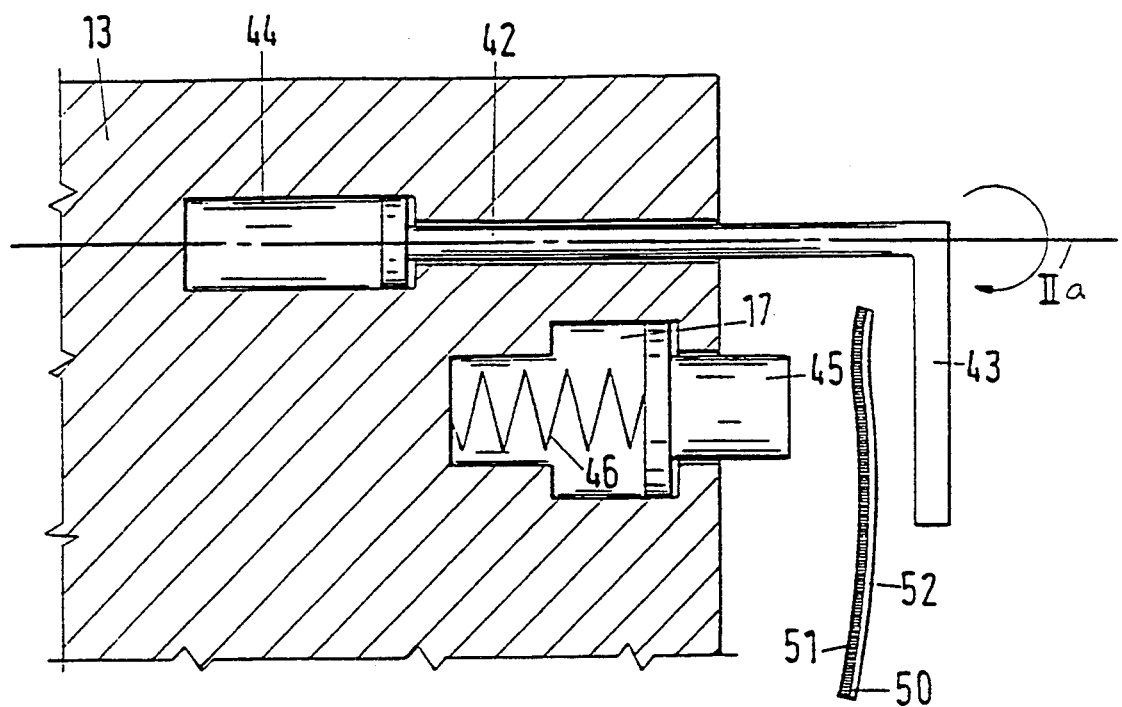
FIG. 3a shows a holding apparatus for the decorative material.

The holding element 42 can thereby be rotated around the longitudinal axis II, so that the gripper hand 43 can be moved toward and away from the decorative material 50. That is, as shown in FIG. 3a, the holding element 42 can be rotated about axis IIa. Thus, the gripper hand 42 can be moved into a position over pressing pin 45, as shown in FIG. 3 and FIG. 3a.

Figure 3B:
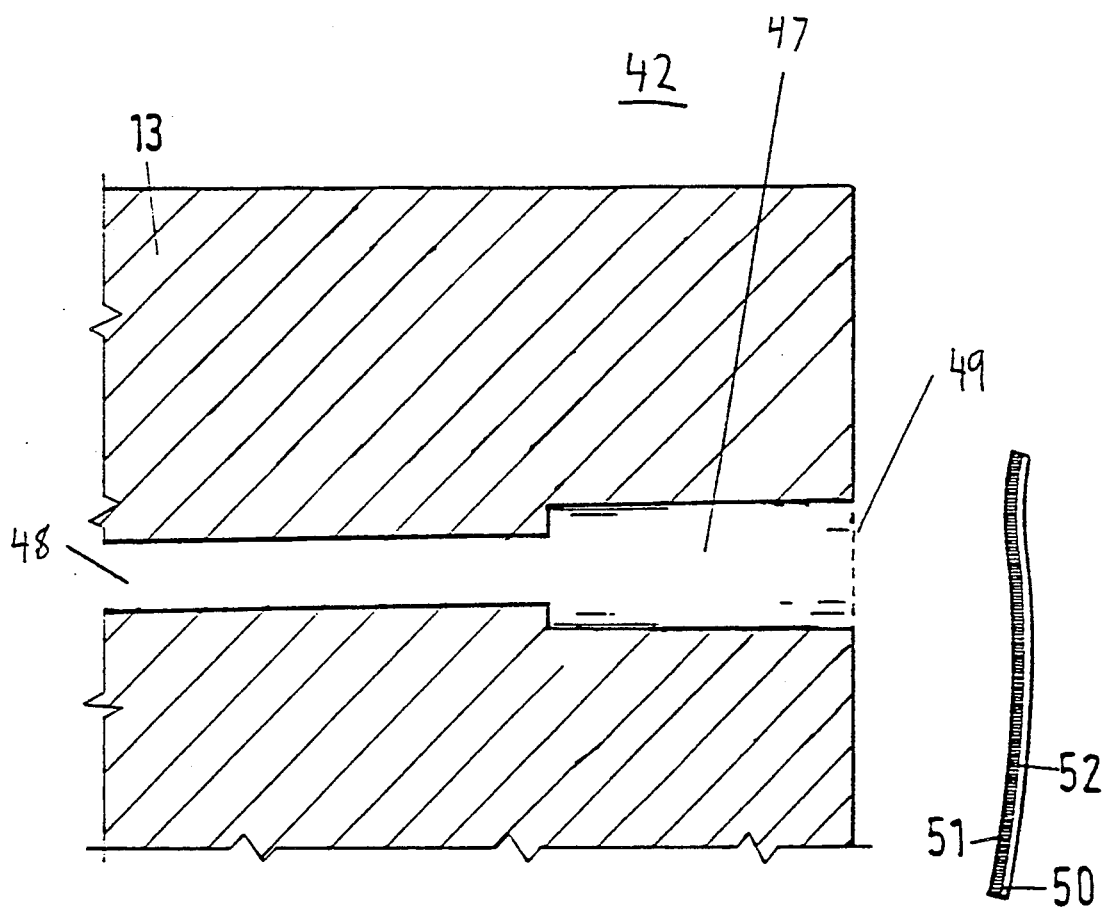
FIG. 3b shows a holding apparatus for the decorative material.

FIG. 3b shows a detail of the movable mold part 13 which has an alternative holding element 42. FIG. 3b shows a suction device 47. Suction device 47 has a vacuum source tube end 48 which is for connection to a vacuum source such as a vacuum pump. On the side of movable mold part 13 facing decorative material 50, vacuum device 47 opens through grate 49. Grate 49 contacts the top surface 51 of decorative material 50, and grate 49 provides support to decorative material 50 in order to prevent damage to the decorative material 50. When the vacuum source is operating, decorative material 50 is held in place by vacuum device 47.

FIG. 4 shows a detail of the stationary mold part 12 and the movable mold part 13. In the mold part 13 there is a groove 18, in which there is a contact bar 61 of an edge molding device 60. The contact bar 61 is pushed out of the lateral surface of the mold part 13 by pressure springs 62, whereby the end surface of the contact bar 61 is in contact with the decorative material 50.

The lateral surface of the stationary mold part 12 has a stepped configuration. The intermediate step 19 facing the movable mold part 13 has a step height a and a shoulder width c. The step height a of the intermediate shoulder 19 is thereby less than the cavity depth b, namely by the order of magnitude of the thickness of the decorative material 50. In the upper portion of FIG. 4, the situation is shown with an opened mold clamping device; in the lower portion of the figure, the mold is closed and the molding compound 70 has been injected into the cavity. Thus, the shoulder 19 and the contact bar 61 pinch the decorative material therebetween and prevent molding compound 70 from reaching the edge of the decorative material 50. FIG. 4a shows the step height a of the intermediate shoulder 19 is thereby less than the cavity depth b', namely by the order of magnitude of the thickness of the decorative material 50.

One aspect of the invention resides broadly in a process for the manufacture of plastic moldings with decorative coating, by injection molding in an injection molding machine with an injection screw which introduces the plastic into the cavity located in a mold clamping device, characterized by the following steps: the decorative material is inserted into the cavity and held so that the upper side of the decorative coating faces the movable part of the mold; the movable part of the mold of the mold clamping device is then moved in the closing direction; not later than after the closing of the mold clamping device, the molding compound is injected by way of a nozzle into the cavity, with the simultaneous measurement of the screw displacement; during the injection of the molding compound by way of a nozzle, at least one additional nozzle is opened to inject the molding compound, as a function of the screw displacement; and after filling the cavity, after a specified length of time, the molding connected to the decorative material is ejected.

Another aspect of the invention resides broadly in a process characterized by the fact that the closing of the mold is done according to the injection compression process.

Yet another aspect of the invention resides broadly in a process characterized by the fact that the injection nozzles are opened and closed in series, in cascade fashion.

A further aspect of the invention resides broadly in a process characterized by the fact that the compression movement of the mold takes place simultaneous with the advance of the screw.

A yet further aspect of the invention resides broadly in a process characterized by the fact that after the filling of the mold, at least one injection nozzle is opened as a function of the beginning of the holding pressure phase.

Yet another further aspect of the invention resides broadly in a process characterized by the fact that before the injection of the molding compound, there is a pre-compression process to fit the inserted decorative material to the contour of the mold.

An additional aspect of the invention resides broadly in an injection molding machine with an injection screw, which is connected by way of closable hot runners to the cavity of a clamping device consisting of a stationary mold part and a movable mold part, including the drive mechanisms, and with measurement and control components for the control of the process according to one of the preceding claims, characterized by the fact that on the injection screw 11 there is a displacement transducer 32, which is connected to an evaluation unit 31, that the evaluation unit 31 is connected to control elements of hot runner shutters 21, 22, that there is a transport apparatus 40 to feed decorative material 50 into the cavity 14, and that there are holding elements 42 on the movable mold part 13 to fix the decorative material 50.

A yet additional aspect of the invention resides broadly in an injection molding machine characterized by the fact that on the hot runner shutters 21, 22 there are elements 34 for position monitoring, which are connected for measurement purposes to the evaluation unit 31.

A further additional aspect of the invention resides broadly in an injection molding machine characterized by the fact that the hot runner shutters 21, 22 have needles 23, on which there are cams 24, by way of which the limit switches 35 can be activated.

A yet further additional aspect of the invention resides broadly in an injection molding machine characterized by the fact that the transport device 40 has a needle gripper 41.

Another further additional aspect of the invention resides broadly in an injection molding machine characterized by the fact that the holding elements 42 for fixing the decorative material 50 have a gripper hand 43, by way of which the decorative material 50 can be pressed against the inside of the movable mold part 13.

A yet another additional aspect of the invention resides broadly in an injection molding machine characterized by the fact that the holding element 42 equipped with the gripper hand 43 can be moved axially parallel to the center axis I of the injection molding machine 10.

Another yet further aspect of the invention resides broadly in an injection molding machine characterized by the fact that the holding element 42 which has the gripper hand 31 which can be moved axially parallel to the center axis I can also be rotated around its axis.

A still further aspect of the invention is an injection molding machine characterized by the fact that there are controllable piston-cylinder units 44 on the foot end of the holding element 42.

A still further additional aspect of the invention resides broadly in an injection molding machine characterized by the fact that as the cavity 14, there are recesses 17 between the walls of the movable mold part 13, in which are located pressing pins 45 which are spring loaded against the contact force of the gripper hand 43.

Another still further additional aspect of the invention resides broadly in an injection molding machine characterized by the fact that on the stationary mold part 12, on the edge of the cavity 14, there is an intermediate step 19, which has a step height a which equals the cavity depth b minus the thickness of the decorative material 50.

Yet another still further additional aspect of the invention resides broadly in an injection molding machine characterized by the fact that on the movable mold part 13, there are pressing bars 61 which can move in grooves 18 axially parallel to the center axis I, and which correspond to the shoulder width c.

Still another yet further additional aspect of the invention resides broadly in an injection molding machine characterized by the fact that the pressing bars 61 have pressing springs, which make it possible to press the edges of the decorative material 50 against the surface of the stationary mold part 12.

Another still further yet additional aspect of the invention resides in an injection molding machine characterized by the fact that the holding elements 42 are suction devices which can be activated by underpressure.

Another still further yet additional aspect of the invention resides in an injection molding machine characterized by the fact that the evaluation unit 31 includes elements 36 for the graphic display of the measurement data received.

An examples of a method for making decorated injection moldings can be found in U.S. Pat. No. 4,427,615 entitled "Method of Making Injection Moulded Plastic Objects with Imbedded Decorative and/or Descriptive Prints".

An example of a method for making a molded article having a coating can be found in U.S. Pat. No. 4,961,894 entitled "Process for Producing Synthetic Resin Molded Articles".

Examples of injection molding machines and/or methods can be found in U.S. Pat. No. 4,540,359 entitled "Injection Molding Machine", U.S. Pat. No. 3,921,963 entitled "Injection Molding Machine Construction and Method of Operation", and U.S. Pat. No. 3,904,078 entitled "Injection Molding Machine having a Programming Device and a Method of Operating the Machine".

Examples of injection-compression molding machines and/or methods can be found in U.S. Pat. No.

5,059,364 entitled "Injection-Compression Molding Machine and Method of Molding by Using the Machine", U.S. Pat. No. 5,057,255 entitled "Molding Method and Molding Apparatus in an Injection-Compression Molding Machine", and U.S. Pat. No. 5,044,925 entitled "Injection-Compression Mold".

An example of a process control can be found in U.S. Pat. No. 4,146,601 entitled "Injection Mold Process Control".

Examples of hot runner or nozzle valves or shutters can be found in U.S. Pat. No. 5,078,589 entitled "Multicavity Injection Molding Apparatus having Precision Adjustment and Shut Off of Injection Flow to Individual Mold Cavities", U.S. Pat. No. 5,071,340 entitled "Cooling Arrangement for Valve Stem Gates in Hot Runner Injection Molding Machine Systems", and U.S. Pat. No. 5,067,893 entitled "Injection Molding Apparatus with Shut Off Valve Pin Actuation System".

Examples of a clamping apparatus can be found in U.S. Pat. No. 5,066,217 entitled "Clamping Apparatus for an Injection Molding Machine", U.S. Pat. No. 4,781,568 entitled "Mold Clamping Unit of Injection Molding Machine", and U.S. Pat. No. 4,545,756 entitled "Hydraulic Clamping Apparatus for an Injection Molding Machine".

Examples of a transport apparatus and gripper device can be found in U.S. Pat. No. 5,087,315 entitled "Fabric Lifting Apparatus and Method", U.S. Pat. No. 5,056,246 entitled "Device for Taking Trousers Off an Ironing Machine", U.S. Pat. No. 5,048,815 entitled "Gripper Device on Sheet-Feed Rotary Printing Machines", and U.S. Pat. No. 4,889,221 entitled "Vending Machine for Newspapers or Periodicals".

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Process for the manufacture of moldings with a decorative material coating, the decorative material coating having a lower side and a decorated upper side, the plastic molding with a decorative material coating being manufactured by injection molding in an injection molding machine, the injection molding machine having injection means which injection means advances and introduces a molding compound into a mold cavity located in a mold clamping device, the mold clamping device having a movable mold part, the mold cavity having a mold surface, the process comprising the following steps:

inserting the decorative material coating into the mold cavity and holding the decorative material coating so that the decorated upper side of the decorative coating faces the mold surface of the mold cavity;

moving the movable mold part of the mold clamping device in a closing direction;

at least substantially closing the mold clamping device;

injecting a molding compound through a first nozzle directly into the mold cavity, not later than after at least substantially closing the mold clamping device;

simultaneously measuring the displacement of the injection means while injecting the molding compound, and thereby measuring the amount of molding compound injected into the mold cavity;

opening at least a second nozzle through which molding compound is also injected, said at least one second nozzle being connected directly into the mold cavity, said opening of said at least a second nozzle comprising opening control element means controlling solely said at least a second nozzle to permit simultaneous flow of molding compound through said at least one second nozzle directly into the mold cavity during the injecting of the molding compound through the first nozzle into the mold cavity, said control element means being opened in response to said measuring of the displacement of the injection means to permit flow of molding compound through said at least one second nozzle;

said opening of said at least a second nozzle comprising opening said control element means independently of said injecting through said first nozzle;

said control element means being opened in response to the measuring of a displacement of the injection means corresponding to at least one fixed volumetric fill level of the mold cavity to permit said flow of molding compound through said at least one second nozzle;

said first nozzle and said at least one second nozzle each injecting molding compound at separate locations into the mold cavity;

maintaining the internal mold pressure in the mold cavity at a uniform pressure level by opening said at least one second nozzle to maintain said uniform pressure level, said opening said at least one second nozzle to maintain said uniform pressure level being based on the displacement of the injection means;

at least substantially filling the mold cavity with molding compound;

waiting a specified length of time to allow setting of the molding compound; and ejecting the molding connected to the decorative material.

2. Process according to claim 1, wherein the decorated upper side of the decorative coating faces the movable part of the mold clamping device.

3. Process according to claim 2, wherein the closing of the mold is done according to the injection compression process such that closing the mold occurs substantially at the end of injecting the molding compound which closing is a compression movement.

4. Process according to claim 3, wherein the injection nozzles are opened and closed in series, in cascade fashion.

5. Process according to claim 4, wherein the compression movement of the mold takes place simultaneously with the advance of the injection means.

6. Process according to claim 4, further comprising the step of opening at least one injection nozzle after filling the mold cavity for the purpose of beginning a holding pressure phase.

7. Process according to claim 1, wherein:
said process comprises the step of pre-compressing the inserted decorative material to the contour of the mold before injecting the molding compound; and
said injection means comprises an injection screw.

8. Process according to claim 1, further comprising the step of advancing the injection means;
wherein said opening at least a second nozzle is subsequent to said advancing the injecting means.

9. Process according to claim 8, wherein said opening at least a second nozzle is subsequent to said injecting of a molding compound through said first nozzle.

10. The process according to claim 1, wherein said at least one second nozzle comprises a plurality of second nozzles;
said control means for controlling said at least one second nozzle comprises a plurality of control elements each for controlling a corresponding one of said plurality of second nozzles;
switching means connected to said control elements for opening and closing said control elements;
said switching means being configured for opening said plurality of switching elements to open said plurality of second nozzles at fixed volumetric fill levels of the mold;
operating said plurality of second nozzles at fixed volumetric fill levels of the mold.

11. Process according to claim 10, controlling the plurality of control elements as a function of the distance of displacement of the injection means, and thus maintaining the pressure within the mold at a uniform level during the injection of the molding compound.

12. Process according to claim 11, wherein said injection means comprises a screw and said displacement of said injection means comprises the displacement of the screw;
reducing the velocity of the screw at the end of the injection motion of the screw and thus at the end of the injection of molding compound into the mold.

13. Process according to claim 12, including continuously flowing the melt front of the injected molding compound by opening the plurality of control elements and flowing molding compound into the mold at separate locations and compressing the mold together to thereby minimize the injection time of the molding compound and the compression time of the mold.

14. Process according to claim 13, including compressing the mold together and opening a number of the plurality of control elements at the end of the injection of molding compound into the mold cavity to provide a holding pressure during said compressing of the mold.

15. Process according to claim 14, including inserting a material into the mold to be molded upon by the injection of the molding compound, wherein the molding in the molding cavity is molded on said material, said material selected from the group consisting of a textile and a film decoration;
maintaining the pressure within the mold at a pressure level to minimize damage to the material inserted in the mold to be molded upon;
after the opening of the mold grabbing the molded material with a grabber;
rotating the hand of the gripper arm of the grabber by 180 degrees;
moving the gripper arm perpendicular to the direction of the movement of a piece of the mold;
fixing the movement of the gripper arm toward the mold half, said mold half gripping the molded article, moving the gripper arm in a further axial movement of the gripper arm;
providing a spring loaded pin which projects out of the mold half against the molded material;
individually coordinating the compression and screw advance velocity to maintain a minimum internal pressure within the mold;
wherein the decorated upper side of the decorative coating faces the movable part of the mold clamping device;
wherein the closing of the mold is done according to the injection compression process such that closing the mold occurs substantially at the end of injecting the molding compound which closing is a compression movement;
wherein the injection nozzles are opened and closed in series, in cascade fashion;
wherein the compression movement of the mold takes place simultaneously with the advance of the injection means;
further comprising the step of opening at least one injection nozzle after filling the mold cavity for the purpose of beginning a holding pressure phase; and
wherein:
said process comprises the step of pre-compressing the inserted decorative material to the contour of the mold before injecting the molding compound.

16. The process according to claim 9, wherein said at least one second nozzle comprises a plurality of second nozzles;
said control means for controlling said at least one second nozzle comprises a plurality of control elements each for controlling a corresponding one of said plurality of second nozzles;
switching means connected to said control elements for opening and closing said control elements;
said switching means being configured for opening said plurality of switching elements to open said plurality of second nozzles at fixed volumetric fill levels of the mold;
operating said plurality of second nozzles at fixed volumetric fill levels of the mold;
controlling the plurality of control elements as a function of the distance of displacement of the injection mean, and thus maintaining the pressure within the mold at a uniform level during the injection of the molding compound;
wherein said injection means comprises a screw and said displacement of said injection means comprises the displacement of the screw;
reducing the velocity of the screw at the end of the injection motion of the screw and thus at the end of the injection of molding compound into the mold;
including continuously flowing the melt front of the injected molding compound by opening the plurality of control elements and flowing molding compound into the mold at separate locations and times and compressing the mold together to thereby minimize the injection time of the molding compound and the compression time of the mold;

including compressing the mold together and opening a number of the plurality of control elements at the end of the injection of molding compound into the mold cavity to provide a holding pressure during said compressing of the mold;

including inserting the decorative material into the mold to be molded upon by the injection of the molding compound, wherein the molding in the molding cavity is molded on said material, said material comprising at least one of: a textile and a film decoration;

maintaining the pressure within the mold at a pressure level to minimize damage to the material inserted in the mold to be molded upon;

after the opening of the mold grabbing the molded material with a grabber;

rotating the hand of the gripper arm of the grabber by 180 degrees;

moving the gripper arm perpendicular to the direction of the movement of a piece of the mold;

fixing the movement of the gripper arm toward the mold half, said mold half gripping the molded article, moving the gripper arm in a further axial movement of the gripper arm;

providing a spring loaded pin which projects out of the mold half against the molded material;

individually coordinating the compression and screw advance velocity to maintain a minimum internal pressure within the mold;

wherein the decorated upper side of the decorative coating faces the movable part of the mold clamping device;

wherein the closing of the mold is done according to the injection compression process such that closing the mold occurs substantially at the end of injecting the molding compound which closing is a compression movement;

wherein the injection nozzles are opened and closed in series, in cascade fashion;

wherein the compression movement of the mold takes place simultaneously with the advance of the injection means;

further comprising the step of opening at least one injection nozzle after filling the mold cavity for the purpose of beginning a holding pressure phase; and wherein:

said process comprises the step of pre-compressing the inserted decorative material to the contour of the mold before injecting the molding compound.

17. Process for the manufacture of moldings with a decorative material coating, the decorative material coating having a lower side and a decorated upper side, the plastic molding with a decorative material coating being manufactured by injection molding in an injection molding machine, the injection molding machine having injection means which injection means advances and introduces a molding compound into a mold cavity located in a mold clamping device, the mold clamping device having a movable mold part, the mold cavity having a mold surface, the process comprising the following steps:

inserting the decorative material coating into the mold cavity and holding the decorative material coating so that the decorated upper side of the decorative coating faces the mold surface of the mold cavity;

moving the movable mold part of the mold clamping device in a closing direction;

at least substantially closing the mold clamping device;

injecting a molding compound through a first nozzle directly into the mold cavity, not later than after at least substantially closing the mold clamping device;

simultaneously measuring the displacement of the injection means while injecting the molding compound, and thereby measuring the amount of molding compound injected into the mold cavity;

opening at least a second nozzle through which molding compound is also injected, said at least one second nozzle being connected directly into the mold cavity, said opening of said at least a second nozzle comprising opening a control element means to permit simultaneous flow of molding compound through said at least one second nozzle directly into the mold cavity during the injection of the molding compound through the first nozzle into the mold cavity, said control element means being opened in response to said measuring of the displacement of the injection means to permit flow of molding compound through said at least one second nozzle;

said control element means being opened in response to the measuring of a displacement of the injection means corresponding to at least one fixed volumetric fill level of the mold cavity to permit said flow of molding compound through said at least one second nozzle;

said first nozzle and said at least one second nozzle each injecting molding compound at separate locations into the mold cavity;

maintaining the internal mold pressure in the mold cavity at a uniform pressure level by opening said at least one second nozzle to maintain said uniform pressure level, said opening said at least one second nozzle to maintain said uniform pressure level being based on the displacement of the injection means;

at least substantially filling the mold cavity with molding compound;

waiting a specified length of time to allow setting of the molding compound; and ejecting the molding connected to the decorative material.

18. The process according to claim 17, wherein said at least one second nozzle comprises a plurality of second nozzles;

said control means for controlling said at least one second nozzle comprises a plurality of control elements each for controlling a corresponding one of said plurality of second nozzles;

switching means connected to said control elements for opening and closing said control elements;

said switching means being configured for opening said plurality of switching elements to open said plurality of second nozzles at fixed volumetric fill levels of the mold;

operating said plurality of second nozzles at fixed volumetric fill levels of the mold;

controlling the plurality of control elements as a function of the distance of displacement of the injection mean, and thus maintaining the pressure within the mold at a uniform level during the injection of the molding compound;

wherein said injection means comprises a screw and said displacement of said injection means comprises the displacement of the screw;

reducing the velocity of the screw at the end of the injection motion of the screw and thus at the end of the injection of molding compound into the mold;

including continuously flowing the melt front of the injected molding compound by opening the plurality of control elements and flowing molding compound into the mold at separate locations and times and compressing the mold together to thereby minimize the injection time of the molding compound and the compression time of the mold;

including compressing the mold together and opening a number of the plurality of control elements at the end of the injection of molding compound into the mold cavity to provide a holding pressure during said compressing of the mold;

including inserting the decorative material into the mold to be molded upon by the injection of the molding compound, wherein the molding in the molding cavity is molded on said material, said material comprising at least one of: a textile and a film decoration;

maintaining the pressure within the mold at a pressure level to minimize damage to the material inserted in the mold to be molded upon;

after the opening of the mold grabbing the molded material with a grabber;

rotating the hand of the gripper arm of the grabber by 180 degrees;

moving the gripper arm perpendicular to the direction of the movement of a piece of the mold;

fixing the movement of the gripper arm toward the mold half, said mold half gripping the molded article, moving the gripper arm in a further axial movement of the gripper arm;

providing a spring loaded pin which projects out of the mold half against the molded material;

individually coordinating the compression and screw advance velocity to maintain a minimum internal pressure within the mold;

wherein the decorated upper side of the decorative coating faces the movable part of the mold clamping device;

wherein the closing of the mold is done according to the injection compression process such that closing the mold occurs substantially at the end of injecting the molding compound which closing is a compression movement;

wherein the injection nozzles are opened and closed in series, in cascade fashion;

wherein the compression movement of the mold takes place simultaneously with the advance of the injection means;

further comprising the step of opening at least one injection nozzle after filling the mold cavity for the purpose of beginning a holding pressure phase; and wherein:

said process comprises the step of pre-compressing the inserted decorative material to the contour of the mold before injecting the molding compound.

19. Process for the manufacture of moldings with a decorative material coating, the decorative material coating having a lower side and a decorated upper side, the plastic molding with a decorative material coating being manufactured by injection molding in an injection molding machine, the injection molding machine having injection means which injection means advances and introduces a molding compound into a mold cavity located in a mold clamping device, the mold clamping device having a movable mold part, the mold cavity having a mold surface, the process comprising the following steps:

inserting the decorative material coating into the mold cavity and holding the decorative material coating so that the decorated upper side of the decorative coating faces the mold surface of the mold cavity;

moving the movable mold part of the mold clamping device in a closing direction;

at least substantially closing the mold clamping device;

injecting a molding compound through a first nozzle directly into the mold cavity, not later than after at least substantially closing the mold clamping device;

simultaneously measuring the displacement of the injection means while injecting the molding compound, and thereby measuring the amount of molding compound injected into the mold cavity;

opening at least a second nozzle through which molding compound is also injected, said at least one second nozzle being connected directly into the mold cavity, said opening of said at least a second nozzle comprising opening a control element means to permit simultaneous flow of molding compound through said at least one second nozzle directly into the mold cavity during the injection of the molding compound through the first nozzle into the mold cavity, said control element means being opened in response to said measuring of the displacement of the injection means to permit flow of molding compound through said at least one second nozzle;

said control element means being opened in response to the measuring of a displacement of the injection means corresponding to at least one fixed volumetric fill level of the mold cavity to permit said flow of molding compound through said at least one second nozzle;

said first nozzle and said at least one second nozzle each injecting molding compound at separate locations into the mold cavity;

at least substantially filling the mold cavity with molding compound;

waiting a specified length of time to allow setting of the molding compound; and ejecting the molding connected to the decorative material.

20. The process according to claim 19, wherein said at least one second nozzle comprises a plurality of second nozzles;

said control means for controlling said at least one second nozzle comprises a plurality of control elements each for controlling a corresponding one of said plurality of second nozzles;

switching means connected to said control elements for opening and closing said control elements;

said switching means being configured for opening said plurality of switching elements to open said plurality of second nozzles at fixed volumetric fill levels of the mold;

operating said plurality of second nozzles at fixed volumetric fill levels of the mold;

controlling the plurality of control elements as a function of the distance of displacement of the injection means and thus maintaining the pressure within the mold at a uniform level during the injection of the molding compound;

wherein said injection means comprises a screw and said displacement of said injection means comprises the displacement of the screw;

reducing the velocity of the screw at the end of the injection motion of the screw and thus at the end of the injection of molding compound into the mold;

including continuously flowing the melt front of the injected molding compound by opening the plurality of control elements and flowing molding compound into the mold at separate locations and times and compressing the mold together to thereby minimize the injection time of the molding compound and the compression time of the mold;

including compressing the mold together and opening a number of the plurality of control elements at the end of the injection of molding compound into the mold cavity to provide a holding pressure during said compressing of the mold;

including inserting the decorative material into the mold to be molded upon by the injection of the molding compound, wherein the molding in the molding cavity is molded on said material, said material comprising at least one of: a textile and a film decoration;

maintaining the pressure within the mold at a pressure level to minimize damage to the material inserted in the mold to be molded upon;

after the opening of the mold grabbing the molded material with a grabber;

rotating the hand of the gripper arm of the grabber by 180 degrees;

moving the gripper arm perpendicular to the direction of the movement of a piece of the mold;

fixing the movement of the gripper arm toward the mold half, said mold half gripping the molded article, moving the gripper arm in a further axial movement of the gripper arm;

providing a spring loaded pin which projects out of the mold half against the molded material;

individually coordinating the compression and screw advance velocity to maintain a minimum internal pressure within the mold;

wherein the decorated upper side of the decorative coating faces the movable part of the mold clamping device;

wherein the closing of the mold is done according to the injection compression process such that closing the mold occurs substantially at the end of injecting the molding compound which closing is a compression movement;

wherein the injection nozzles are opened and closed in series, in cascade fashion;

wherein the compression movement of the mold takes place simultaneously with the advance of the injection means;

further comprising the step of opening at least one injection nozzle after filling the mold cavity for the purpose of beginning a holding pressure phase; and wherein:

said process comprises the step of pre-compressing the inserted decorative material to the contour of the mold before injecting the molding compound.

* * * * *